United States Patent [19]
Bolza-Schunemann et al.

[11] Patent Number: 5,317,390
[45] Date of Patent: May 31, 1994

[54] METHOD FOR JUDGING PRINTING SHEETS

[75] Inventors: Claus A. Bolza-Schunemann; Hans-Bernhard Bolza-Schunemann; Albrecht J. Germann, all of Wurzburg, Fed. Rep. of Germany

[73] Assignee: Koenig & Bauer, Aktiengesellschaft, Wurzburg, Fed. Rep. of Germany

[21] Appl. No.: 925,273

[22] Filed: Aug. 6, 1992

[30] Foreign Application Priority Data

Aug. 12, 1991 [DE] Fed. Rep. of Germany ....... 4126582

[51] Int. Cl.$^5$ .............................................. G01B 11/00
[52] U.S. Cl. ................................................... 356/394
[58] Field of Search ......................................... 356/394

[56] References Cited

U.S. PATENT DOCUMENTS 4,390,958  6/1983  Mamberer .
4,561,103  12/1985  Horiguchi et al. .................. 356/394
4,677,680  6/1987  Harima et al. ...................... 356/394

FOREIGN PATENT DOCUMENTS 1204880  5/1986  Canada .
0142470  5/1985  European Pat. Off. .
0159880  10/1985  European Pat. Off. .
0194331  of 1986  European Pat. Off. .
0332706  9/1989  European Pat. Off. .
2950606  6/1981  Fed. Rep. of Germany .

OTHER PUBLICATIONS

A. Rosenfeld, "Multiresolution Image Processing and Analysis", Springer Series in Information Sciences, 1984, pp. 1–5, 364–379, Berlin.
Sobey et al., "Detection and Sizing Visual Features in Wood", Pattern Recognition, Bd. 22, Nr. 4, 1989, Elmsford, NY US, pp. 367–380.
Tanimizu, "High Speed Defect Detection Method for Coloer Printed Matter", 16th Annual Conference of IEEE Industrial Electronics Society, Bd. 1, 27 Nov. 1990, Asilomar Conference Center CA. (US), pp. 653–658.

Primary Examiner—F. L. Evans
Attorney, Agent, or Firm—Jones, Tullar & Cooper

[57] ABSTRACT

Individual printed image elements from an image to be inspected are allotted individual nominal ink density values, as by scanning an ideal printed sheet by a CCD matrix camera. The ideal values are stored in a main memory having segments for maximum and minimum values for each image element. A multiplicity of proof images are scanned, and their density values measured and stored for each proof judged acceptable by an inspector. Thereafter, the variations in the acceptable proof density values are stored in the main memory as maximum and minimum acceptable deviations from the initial nominal values for each individual image element to provide a subjective tolerance value for the nominal density values in the main memory.

10 Claims, 4 Drawing Sheets

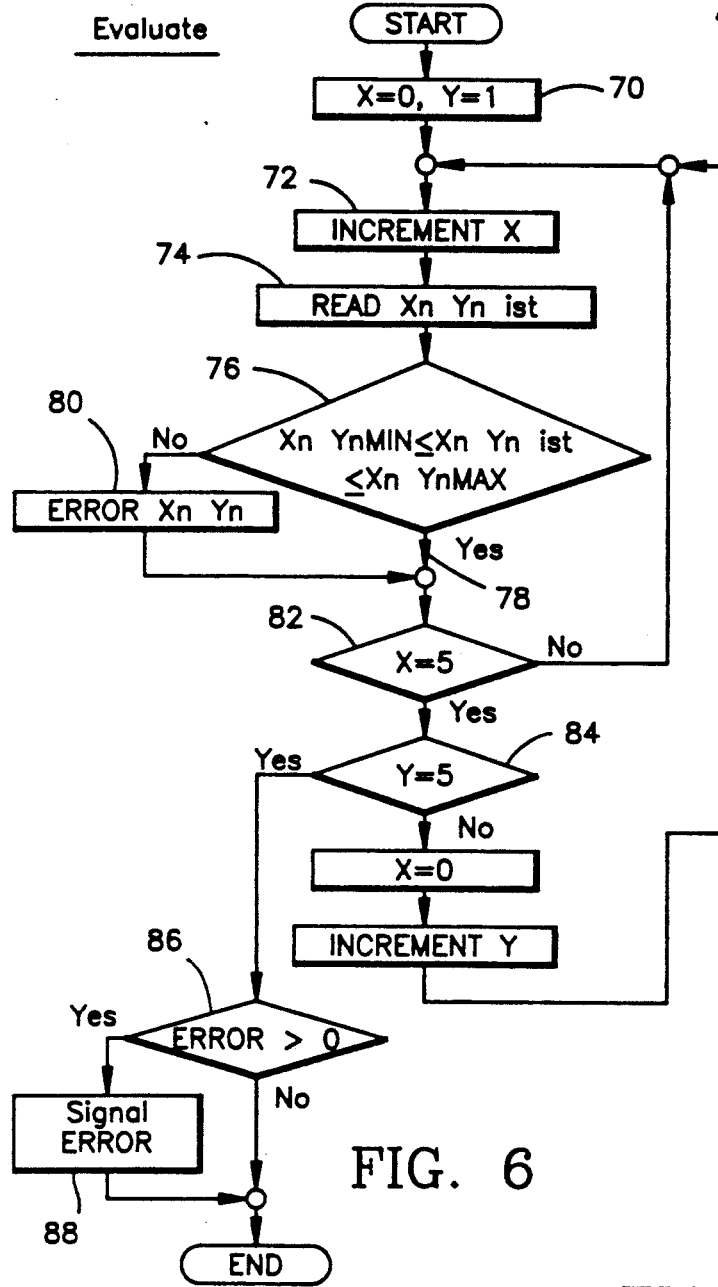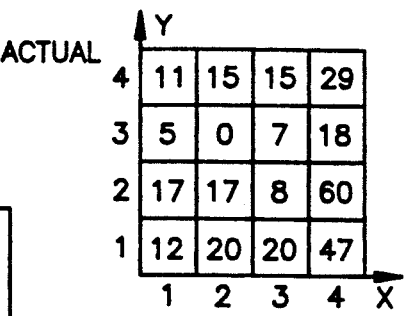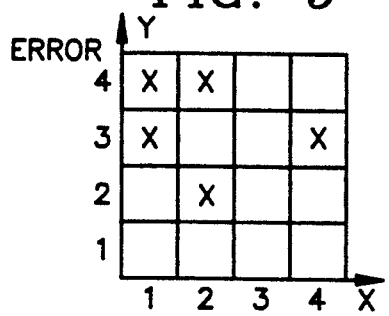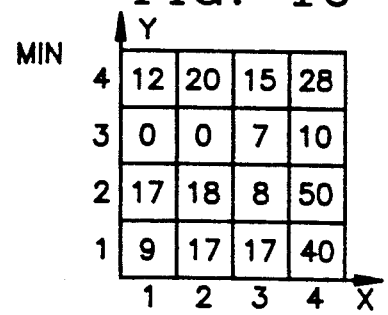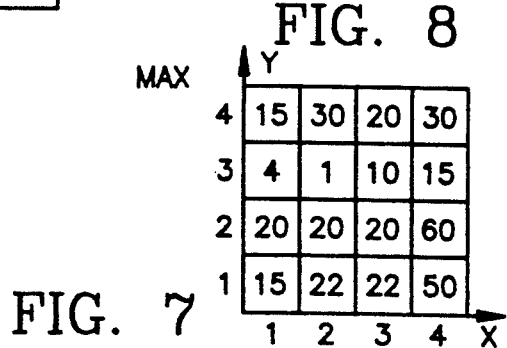

METHOD FOR JUDGING PRINTING SHEETS

BACKGROUND OF THE INVENTION

The present invention relates, in general, to a procedure for judging the quality of printed sheets. More particularly, the invention relates to a method for judging the quality of printed images on a printing carrier, such as paper, wherein a master image is obtained by first electronically scanning a master printed sheet, and thereafter scanning a multiplicity of proof sheets that have been judged to be acceptable by a human inspector to establish a subjective tolerance range for each of a plurality of image pixels. Subsequently, printed sheets are electronically reviewed and the ink density in selected pixels is compared with the stored values for those pixels. Sheets with ink densities within the allowable tolerance range are judged acceptable, while those with values outside the range are rejected.

Devices for judging the quality of printed sheets, or proof copies, are generally known; see, for example, European published unexamined patent application No. 0194331. The checking of print quality refers to the measuring of ink density values in measuring fields or areas selected for that purpose. Register deviations are checked by measuring special register faults and contrast marks for analyzing dot increases and contrast. Initially, these quality control checks could not be carried out over an entire printed sheet, but systems became available on the market which permitted such monitoring with the help of image exposure devices which project a printed sheet or a section of a printed sheet as a standing image on a monitor. Such standing images were stored in an image memory so that the printer could look at a selected still image of a printed sheet and could control the printed product on-line. Once it was known to do this, it became possible to compare later images derived from the printed products with the stored initial image and to produce signals representing any deviations, and such systems are now known.

However, it has been found such image comparison systems can result in excessive losses, for such systems operate to produce error signals whenever an image element comparison exceeds a predetermined error limit, represented by a defined difference between nominal and actual values. Such a rigid system of detecting errors is unusable in practice, since an exact correspondence of individual image elements between the "master" image and a printed image cannot be guaranteed during a printing run because of a variety of factors such as deformation of the print carrier, and the like. Such displacements of printed image elements can cause error signals in an automatic system even though the differences between the master image and the proof image are small, and would be judged acceptable by an inspector.

A difficulty with automatic image comparison systems, therefore, is that they may result in rejection of a printed image in cases where an inspector might consider the differences to be insufficient to cause an error signal. Tests have shown that visual examination of a printed image for the detection of printing errors is very subjective. When examining homogeneous surfaces; for example, unprinted sections, the human eye acts with the highest sensitivity to detect errors, and in such a situation, the slightest irregularities will be recognized immediately. On the other hand, the same irregularities within a printed section may not be recognized by a human inspector. However, both irregularities would cause an automatic inspection system to reject the printed image. Thus, there are significant limits to the use of automatic error detection systems for measuring irregularities in a printed product.

BRIEF SUMMARY OF THE INVENTION

It is, therefore, an object of the present invention to provide a procedure for controlling printed sheets in which quality control is obtained by an opto-electronic system and wherein the results of such control are substantially identical to the results that would be obtained by a trained human inspector.

It is another object of the invention to utilize the properties of the human eye and brain for substantive error detection to the greatest degree possible for image comparison quality control.

In accordance with the invention, a master image having specified density values for individual image elements (pixels) are identified and each is allocated an individual error tolerance in an inventory manner. Such allowable errors may be visualized as a graphical display in three dimensions by "error mountains". These pixel values can then be used as the basis for judging the quality of a printed image automatically, with the result that the number of trained inspectors required to inspect a product can be greatly reduced, without reducing the quality of the printed material being produced. Furthermore, inspectors will be relieved from the very demanding task of inspecting individual sheets of printed material, which inspection must be interrupted repeatedly by breaks to allow the inspectors to rest. Furthermore, it is possible to consider allowable register deviations or other deviations during such quality control and to operate the procedure both for web-fed and sheet-fed rotary printing presses. The system thus allows the capacities of the human eye and brain to make error judgments to be utilized for image comparison and quality control.

Briefly, in accordance with the present invention, a region of a printed image which is to be inspected is divided into a number of individual image elements, or pixels, and each individual image element is allocated a nominal ink density value. These nominal values can, for example, be determined by scanning an "ideal" printed sheet as by means of a CCD-matrix or single line camera, with the ideal ink density values being recorded or stored in corresponding memory elements. Thereafter, each individual image element is allocated an individual error tolerance range between maximum and minimum values. This allowable tolerance range for each image element is determined by scanning a multitude of printed "proof" sheets which have been judged by a trained inspector to be "good", even though they may have register or density errors. The density values of these "good" printed sheets, or printed images, provide a minimum and maximum allowable tolerance for the nominal ink density value, or the "gray" value. By this judging procedure, tolerance values are obtained not only for register errors but for density errors in homogeneous image sections.

A basic advantage produced by reason of this procedure is that a very accurate determination of allowable tolerance values is obtainable not only for register errors but for density errors in homogeneous image sections. To obtain an accurate comparison of images with a master in prior systems it was imperative to position the original, or "master" in the image memory so that the X and Y coordinates for each individual image element was identical to the location of the corresponding image elements on the printed product to be inspected. This correspondence between the image to be inspected and the master image was very important since there was only a single ink density Value, or gray value, for each image element.

The basic advantage of the present system, on the other hand, is the flexible analysis of characteristics of printed images or printed sheets to be controlled. The quality of the master image not only is controlled by the quality of the initial test image, but is dependent on the quantity of images read by the system and judged by the printer or inspector to be of good quality. The result of this is a master image which, in effect, has a three-dimensional tolerance field for each image element, the location of the element being in an X-Y plane and the value of ink density including both nominal and tolerance values being identified in a Z direction.

Image elements having measured ink density values which are outside the allowable tolerance field are identified by error signals having X-Y coordinates corresponding to the location of the elements. Such signals may be indicated in bright color on a monitor or may be identified by means of a marking device, for example, an ink-jet printing device, on the sheet being monitored or on a position corresponding to the error on a separate sheet.

The present process provides a high degree of error sensitivity in homogeneous image sections, with the error measurements being independent of absolute ink density but dependent only on allowable ink density tolerances within the individual elements. The system further allows register deviations while still permitting density measurements within the individual elements.

BRIEF DESCRIPTION OF THE DRAWINGS

The foregoing and additional objects, features and advantages of the present invention will become apparent from the following detailed description of a preferred embodiment thereof, taken in conjunction with the accompanying drawings, in which:

FIG. 6 is a process diagram illustrating the procedure for evaluating a printed product to be inspected;

FIGS. 7 and 8 represent maximum and minimum ink density distributions for a plurality of proof images;

FIG. 9 is a diagram of an actual ink density distribution in a printed image to be evaluated; and FIG. 10 is a graphical representation of errors derived from a comparison of the FIG. 9 distribution with those of FIGS. 7 and 8.

DESCRIPTION OF PREFERRED EMBODIMENT

Figure 1:
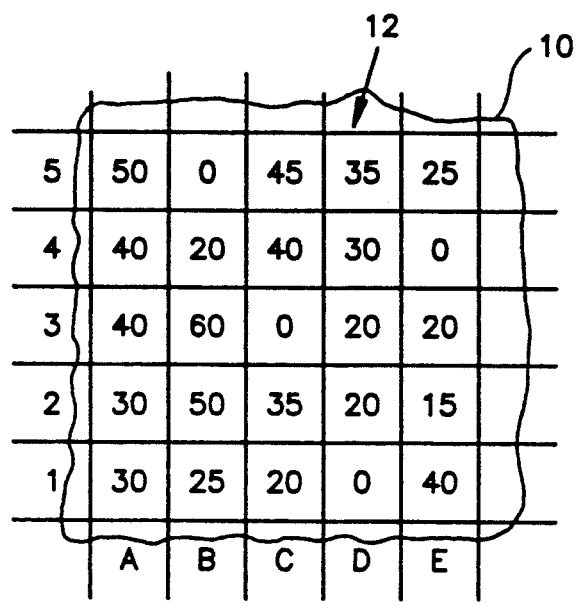
FIG. 1 represents an exemplary nominal ink density distribution in percent for a section of a printed sheet with a multitude of image elements A1 through E5.

As illustrated in FIG. 1, a segment 10 of a printed image on a printing carrier, for example paper, may, for purposes of control, be divided into a plurality of image elements, or pixels arranged in rows and columns of a matrix 12. For convenience, the pixels are arranged in columns A through E along an X axis and in rows 1 through 5 along a Y axis in the exemplary image segment 10, with the individual image elements thus being identifiable as elements A1 through E5. An exemplary nominal ink density distribution in percent is illustrated for the image elements A1 through E5 in FIG. 1. These nominal values could, for example, be determined by scanning an "ideal" printed sheet 14 (FIG. 2) by means of a CCD-matrix or single line camera 16, in known manner. The ink density values measured for each image element are recorded and stored in a suitable intermediate memory 18. The exemplary nominal density distribution indicated numerically in FIG. 1 is illustrated graphically in FIG. 3 in columnar form.

Although each of the image elements is initially assigned an ideal or master ink density value, it is known that these values change continuously during the printing process due, for example, to factors such as ink register variations. Thus, the actual printed ink density having a nominal value $F_D$ for an image element such as D1 will, in reality, usually deviate from the nominal value which is shown in FIG. 1 as being zero. Similarly, the ink density values $F_D$ of 40% and 20% for the adjacent image elements A4 and B4, respectively, may vary. For example, these latter elements may have values of 35% and 25%, respectively, due to outside influences.

If an automatic inspection system permits ink density value variations for all of the image elements A1 to A5 to have only the same predetermined tolerance range so that the printed sheets are evaluated for uniform tolerance values, then sheets will be rejected as being unacceptable which a trained inspector, during subjective consideration of the sheets, might judge as being acceptable.

Such a result can be avoided, in accordance with the present invention, by establishing an allowable tolerance range for each individual image element by taking an inventory of a large number of printed sheets (for example, proof sheets) which are judged subjectively to be acceptable and establishing an allowable tolerance range for each image element. In this way, a minimum and a maximum value of ink density is determined for each individual element from A1 to A5, as illustrated in the three-dimensional graph of FIG. 3. In this Figure, the nominal value is shown for each image element by the unshaded portion of the column; for example, portion 20 of column E1, with the allowable tolerance being indicated by the shaded portion; for example, portion 22 of column E1. In this way, a tolerance range $a$ is established for each image element A1 to E5 which is coordinated with the nominal value of the respective image element. Instead of having a uniform tolerance variation for each element, the individual elements are assigned specific acceptable ranges. Thus, for example, for image element A1, a tolerance range $a_{A1}$ of 10% may be provided, while for image element E5, a tolerance range $a_{E5}$ of 100% may be allowable. The tolerance range is determined by the following:

$$\frac{F_{DMAX} - F_{DMIN}}{F_{DMIN}} = a$$

where $F_{DMAX}$ is the maximum allowable ink density value, $F_{DMIN}$ is the minimum allowable ink density value and a is the tolerance range.

Figure 3:
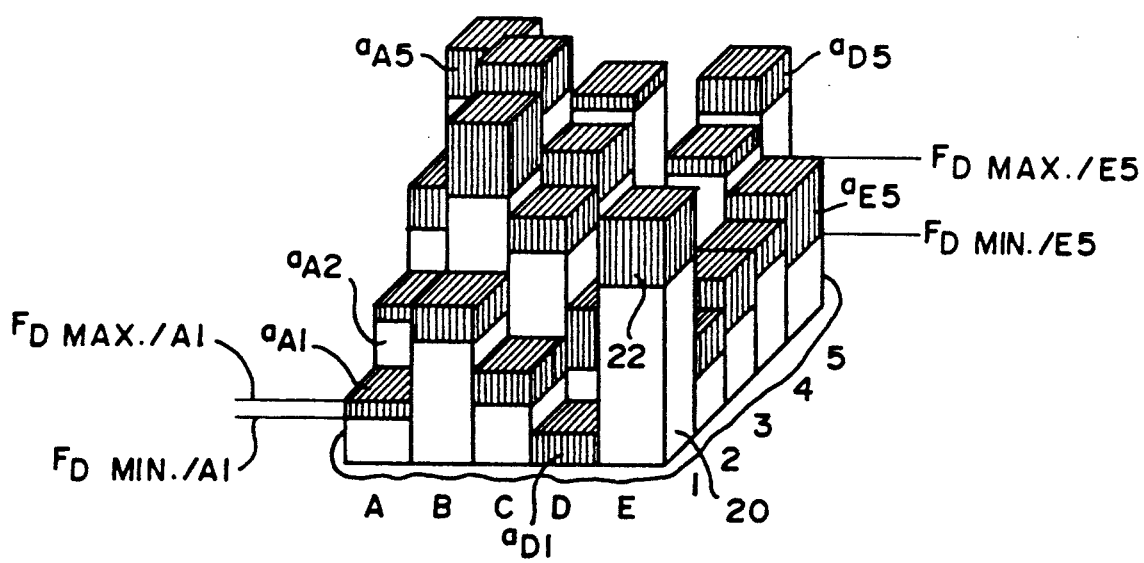
FIG. 3 is a graphical representation of a three dimensional master image showing nominal and tolerance values for each of the image elements of FIG. I.

The establishment of an individual allowable ink density deviation tolerance allocation for each of the individual image elements A1 to E5 enables an optimal automatic quality control of printed sheets. The tolerance allocation which incorporates the subjective values of a trained inspector and thus avoids discarding printed sheets which might not meet a rigidly uniform tolerance value but which would meet the subjective standard of a trained inspector. The practical result of such a process is illustrated in FIG. 3, where each of the exemplary image elements A1 through E5 has an individually determined ink density deviation tolerance $aA1$ through $aE5$ of its own. This tolerance variation is established at the beginning of each new print job for a selected number of image elements which are to serve as the control for the particular print job.

In practice, the individual allowable ink density deviation tolerance value a may be evaluated in a simple way, for example, as follows. After nominal values for each of the image elements are established in a main memory from a master image, a trained inspector commands the camera 16, for example through control 30, to scan a multitude of printed proof sheets 14 successively. Ink density values obtained for each image element of each printed sheet 14 are stored in intermediate memory 18. An identification number is provided on each printed sheet by means of a marking device, and that identification number is also stored in memory 18 with its corresponding image element information.

Figure 4:
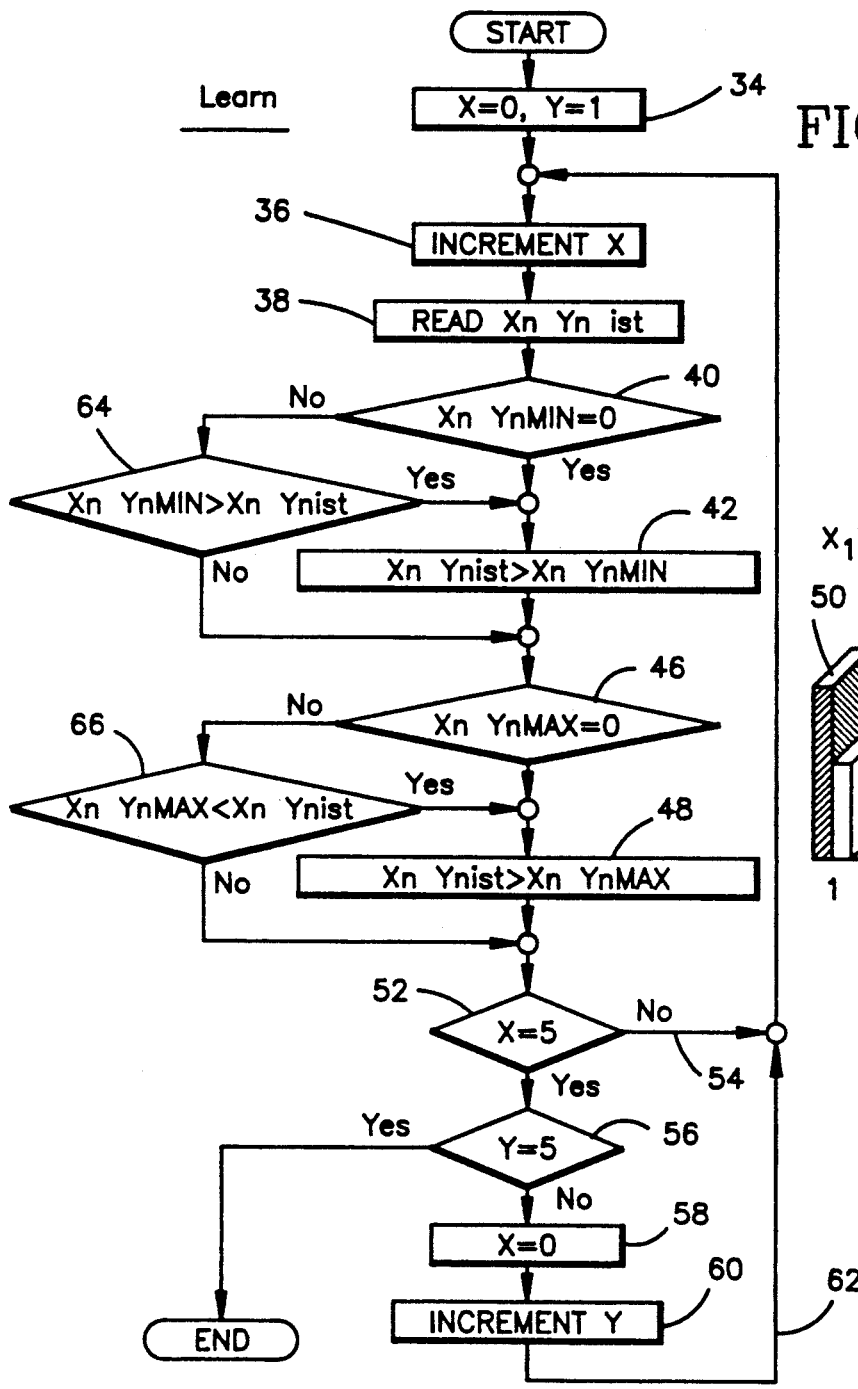
FIG. 4 is a process diagram illustrating the procedure for determining nominal and tolerance values for a master image.

Thereafter, the numbered image sheets, or proof sheets, are subjected to a visual review by an inspector who decides whether each sheet is acceptable or not. The ink density values for any unacceptable proof sheets are deleted from the memory 18. A command is then given to relocate the ink density values $F_D$ for image elements A1 through E5 for each of the acceptable proof sheets from the intermediate memory 18 to the main memory 32. A program operating in accordance with the flow diagram of FIG. 4 enables the memory 32 to learn the acceptable range of values. Accordingly, all of the ink density values of image elements from A1 to E5 for all of the acceptable proof sheets are transferred into the main memory, and to the extent that these proof sheet values differ from the nominal values, the differences are stored as the tolerance values 22. As indicated in FIG. 4, the image elements, or pixels of the printed product to be inspected are addressed in X- and Y-coordinates, the X coordinates corresponding to the columns A through E and the Y coordinates corresponding to the rows 1 through 5 of FIG. 1. Initially, the value of X is equal to zero and the value of Y is equal to one, as indicated in box 34 of FIG. 4.

Figure 5:
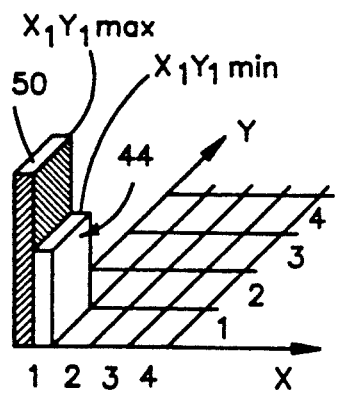
FIG. 5 is a graphical representation of a master image having maximum and minimum values.

To initially enter the nominal values established by the "ideal" or master image into the main memory, the X-coordinate is incremented as indicated at box 36 and the main memory at image element A1 (X=1, Y=1) is read, as indicated at box 38. The main memory 32 has two sections for each image element, one for a maximum value and one for a minimum value, to provide the tolerance range of the present invention, as illustrated in FIG. 5. Initially, both values are zero. As indicated at box 40, the first value read is the minimum, and since this initially is zero, the value of the master image from intermediate memory 18 is entered for the minimum value, as indicated at box 42, at coordinate $X_1$, $Y_1$, and indicated by col. 44 in FIG. 5.

Thereafter, the maximum value in image element $X_1$ $Y_1$ of the main memory 32 is read, as indicated at box 46, and since that value initially is zero, the master image value from intermediate memory 18 is transferred into the main memory, as indicated at box 48. This value is illustrated in FIG. 5 by column 50, and for the ideal image usually will be the same as the entered minimum value. The program determines whether all of the master image values for the Y=1 coordinates have been entered, as indicated at box 52, and if not, the loop is repeated as indicated by line 54. If all of the column entries for row 1 have been completed, then the program determines whether all of the rows have been transferred, at box 56, and if not, the value of X is returned to zero at box 58, the Y coordinate is incremented at box 60 and the loop is repeated by way of line 62. After the initial values for all of the image elements A1 through E5 have been stored in the main memory 32, the program ends.

Although the master, or ideal, image values initially transferred to memory 32 normally will include only a single nominal value for each image element, and will not have maximum or minimum values, nevertheless it may be desirable in some cases to establish a nominal tolerance range by entering maximum and minimum values in main memory 32.

Thereafter, detected density values from the proof sheets judged acceptable which have been stored in the intermediate memory 18 are transferred to the main memory using the same program. However, in this case, a determination is made for each image element as to whether the acceptable value is less than the minimum value already stored in the corresponding element for main memory 32, as at box 64 or is greater than the maximum value in memory 32, as at box 66, and if so, the proof values are substituted for the minimum and maximum values already in the main memory. This is repeated for each of the acceptable proof sheets, and in this way, the minimum and maximum acceptable tolerance values obtained from the multiplicity of proof copies are written over the values established initially in the main memory 32 to provide tolerance values for images to be printed. Since the new maximum and minimum ink density values for each image element are provided from the multiplicity of proof sheets judged acceptable by an inspector, these new values constitute subjective tolerance ranges which will substantially duplicate a human inspector's review of image elements on printed sheets being evaluated.

The new values inserted in the main memory 32 are used for automatic opto-electronic analysis and quality control of future printed sheets containing the same image. The quality control system uses these new values to determine whether a printed image is considered to be acceptable or not acceptable, and gives commands to conventional electronic controllers which transfer the acceptable and non-acceptable commands into control commands for activating, for example, diverters for diverting unacceptable printed images to a waste pile or for activating a suitable marking device for identifying unacceptable images. This comparison process is illustrated in the flow diagram of FIG. 6, the exemplary image element charts of FIGS. 7-9, and the error chart of FIG. 10.

Figure 2:
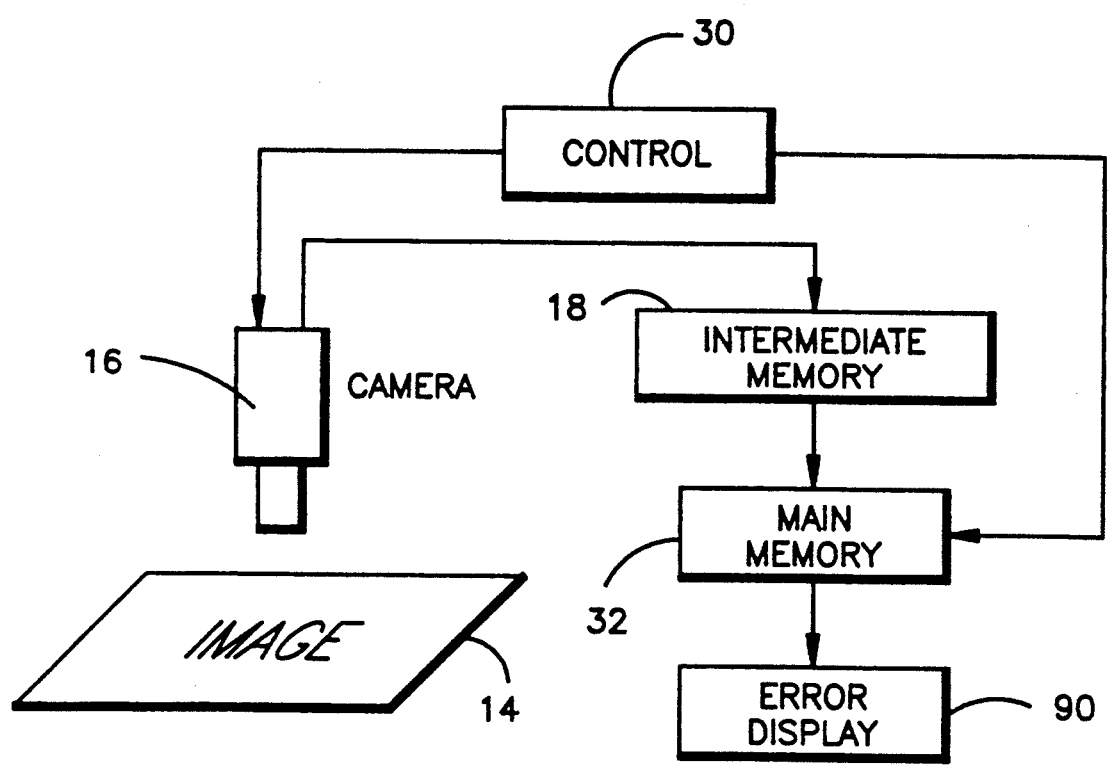
FIG. 2 is a diagram of an optical system for determining nominal and tolerance values for printed images.

As illustrated in FIG. 6, the evaluation process starts at coordinates X=0, Y=1, as indicated at box 70, the X coordinate is incremented at box 72. The stored density value at coordinate X1, Y1 for the image being evaluated is read at box 74. FIG. 7 indicates the maximum values stored in the main memory 32 for acceptable sheets, while FIG. 8 illustrates the minimum values stored in the same locations for an acceptable sheet. FIG. 9 illustrates the actual value of the printed image being evaluated, which values are read at box 74. Thus, for example, the density value at X1, Y1 may have a maximum value of 15% (FIG. 7), may have a minimum value of 9% (FIG. 8), and in an exemplary image to be evaluated, may have an actual value of 12% (FIG. 9). This comparison is carried out in box 76 of FIG. 6 and since the value 12% falls within the maximum and minimum values of FIGS. 7 and 8, an output is provided on line 78 indicating this fact, and no error appears in the location X1, Y1 of FIG. 10. If the actual value did not fall between the maximum and minimum values, the error would be detected at box 80, and this would be indicated on the chart of FIG. 10, and displayed for example on a monitor 90 (FIG. 2). The error signal may also be used to mark the sheet being inspected at the location of the error.

The comparison process is incremented through each of the positions in the X coordinate in box 82 and each of the positions in the Y coordinate in box 84, as discussed with respect to FIG. 4, and when all of the image elements have been compared with the values in the main memory, a determination is made as to whether there has been an error, at box 86. If so, an error signal is generated at box 88 so that the sheet being inspected can be marked or discarded.

The present invention may be used for judging the quality of printed images of both sheet fed and web fed rotary printing presses. Not only paper, but also artificial foils, plastic cards, sheet metals, and the like can be used as the printing carrier. The quality of printed sheets can be determined from any desired number of pixels, or image elements, and an appropriate tolerance range is provided in accordance with the subjective decisions of a human inspector. Although the invention has been described in terms of preferred embodiments, it will be apparent that variations and modifications may be made without departing from the true spirit and scope thereof, as set forth in the following claims.

What is claimed is:

1. A procedure for judging the quality of a printed image printed on a printing carrier comprising:
    dividing a printed image to be judged into a multiplicity of image pixel elements of a preselected size;
    determining a nominal ink density value for each of said image pixel elements and storing such nominal ink density values in a reference image storing device;
    determining from a multiplicity of printed proof images judged to be acceptable the actual proof ink density values for each of said image pixel elements:
    obtaining from said actual values a maximal acceptable ink density value ($F_{D\ MAX}$) and a minimal acceptable ink density value ($F_{D\ MIN}$) for each of said image pixel elements to provide an ink density tolerance range for each said image pixel elements;
    allocating to said stored nominal ink density value for each of said image pixel elements an error tolerance range corresponding to the maximal and minimal acceptable ink density values $F_{D\ MAX}$ and $F_{D\ MIN}$;
    measuring the actual ink density value for each image pixel element for a printed image to be judged; and
    comparing said measured ink density values for each image pixel element to said stored nominal ink density value and error tolerance range to determine the quality of the printed image to be judged.

2. The procedure according to claim 1, further including amending the limits of the allowable maximal and/or minimal ink density values ($D_{D\ MAX}$, $F_{D\ MIN}$) of the image elements.

3. The procedure according to claim 1, further including identifying image elements of printed images which are situated outside the allowable ink density value tolerances ($F_{D\ MAX}$, $F_{D\ MIN}$) by error signals.

4. The procedure according to claim 1, further including identifying image elements of printed images which are situated outside the allowable ink density value tolerances ($F_{D\ MAX}$, $F_{D\ MIN}$) with an identification mark and/or an information for easily identifying the location of such defective image elements.

5. The procedure according to claim 2, further including identifying image elements of printed images which are situated outside the allowable ink density value tolerances ($F_{D\ MAX}$, $F_{D\ MIN}$) by error signals.

6. The procedure according to claim 2, further including identifying printed images containing image elements which are situated outside the allowable ink density value tolerances ($F_{D\ MAX}$, $F_{D\ MIN}$) with an identification mark and/or an information for easily identifying the location of such defective image elements.

7. The procedure according to claim 1, wherein the step of determining actual proof ink density values includes measuring the ink density values of printed proof sheets judged by subjective visual inspection by an inspector to be acceptable, even in the presence of register or density variations from said nominal ink density values.

8. The procedure according to claim 7, wherein the step of comparing is carried out automatically to produce an error signal when the actual ink density value for an image pixel element to be judged is outside said tolerance range.

9. The procedure according to claim 1, wherein the step of determining a nominal ink density values for a printed image comprises measuring the ink density value for each image pixel element of an exemplary printed image.

10. The procedure according to claim 9, wherein the step of determining actual proof ink density values comprises measuring the ink density value for each image pixel element of each of a multiplicity of printed proof images.

* * * * *